(12) United States Patent
Webster et al.

(10) Patent No.: US 7,966,602 B1
(45) Date of Patent: Jun. 21, 2011

(54) INCREMENTAL MODIFICATION DETECTOR, AND METHODS, SYSTEMS, AND APPARATUS FOR IMPLEMENTING THE SAME

(75) Inventors: Christopher B. Webster, Dublin, CA (US); Roderico A. Cruz, Tracy, CA (US); Nam T. Nguyen, Pleasant Hill, CA (US)

(73) Assignee: Oracle America, Inc., Redwood City, CA (US)

( * ) Notice: Subject to any disclaimer, the term of this patent is extended or adjusted under 35 U.S.C. 154(b) by 1313 days.

(21) Appl. No.: 11/378,064

(22) Filed: Mar. 16, 2006

(51) Int. Cl.
*G06F 9/44* (2006.01)
(52) U.S. Cl. .................. 717/114; 717/120
(58) Field of Classification Search ............ None
See application file for complete search history.

(56) References Cited

U.S. PATENT DOCUMENTS

| | | | | |
|---|---|---|---|---|
| 5,475,826 | A * | 12/1995 | Fischer ........................ | 707/1 |
| 6,353,925 | B1 * | 3/2002 | Stata et al. ................... | 717/112 |
| 6,556,983 | B1 * | 4/2003 | Altschuler et al. ............ | 706/55 |
| 6,738,967 | B1 * | 5/2004 | Radigan ........................ | 717/146 |
| 7,096,421 | B2 * | 8/2006 | Lou ............................... | 715/234 |
| 2002/0038296 | A1 * | 3/2002 | Margolus et al. ............. | 707/1 |
| 2003/0046260 | A1 * | 3/2003 | Satyanarayanan et al. ... | 707/1 |
| 2003/0145282 | A1 * | 7/2003 | Thomas et al. ............... | 715/513 |
| 2003/0145310 | A1 * | 7/2003 | Thames et al. ............... | 717/123 |
| 2004/0186817 | A1 * | 9/2004 | Thames et al. ............... | 707/1 |
| 2005/0039116 | A1 * | 2/2005 | Slack-Smith ................. | 715/511 |
| 2006/0123017 | A1 * | 6/2006 | Berg et al. .................... | 707/100 |
| 2006/0123332 | A1 * | 6/2006 | Berg et al. .................... | 715/512 |

OTHER PUBLICATIONS

John Savill "How can I generate a hash value for a file or folder?" Windows IT Pro May 16, 2005 <http://www.windowsitpro.com/article/authentication/how-can-i-generate-a-hash-value-for-a-file-or-folder-.aspx>.*
"MD5" Wikidpedia May 24, 2010 <http://en.wikipedia.org/wiki/MD5>.*

* cited by examiner

*Primary Examiner* — Michael J Yigdall
*Assistant Examiner* — Samuel Hayim
(74) *Attorney, Agent, or Firm* — Martine Penilla & Gencarlla, LLP

(57) ABSTRACT

A method for selecting an annotation processor associated with an annotation for reprocessing is provided. The annotation is included in a computer software source code. An annotation snapshot is captured and a hash value is generated for the annotation snapshot. The annotation snapshot hash value is compared with a hash value of a previous annotation snapshot. The annotation processor associated with the annotation is marked for reprocessing when the annotation snapshot hash value is different from the hash value of the previous annotation snapshot.

14 Claims, 7 Drawing Sheets

| | |
|---|---|
| A.1: {B, C, D} | a.1: b + c + d |
| A.2: {E, F} | a.2: e + f |
| A.3: {G} | a.3: g |
| A.4: {H, I} | a.4: h + i |
| Source File | S |

Fig. 1C

S = Hash Value of Source Structural Information (e.g., class names, class declarations, fields, variables, methods, attributes, etc.)

Fig. 1D

| | |
|---|---|
| A.1: {B, C, D} | a.1: b + c + d |
| ~~A.2: {E, F}~~ | |
| A.3': {G, J, K} | a.3': g + j + k |
| A.4': {H} | a.4': h |
| A.5: {L, M} | a.5: l + m |
| Source File' | S' |

Fig. 3B a.1 = Hash Value of Annotation B Structural Information
(e.g., class, methods, attributes, etc.)
+
Hash Value of Annotation C Structural Information
(e.g., class, methods, attributes, etc.)
+
Hash Value of Annotation D Structural Information
(e.g., class, methods, attributes, etc.)

Fig. 3C

INCREMENTAL MODIFICATION DETECTOR, AND METHODS, SYSTEMS, AND APPARATUS FOR IMPLEMENTING THE SAME

BACKGROUND

Annotations can be used by software program developers to associate arbitrary attributes with classes, methods, and fields. For instance, developers may inject annotations throughout a Java source code file to simplify software development. An Annotation Processing Tool (hereinafter referred to as "APT") is invoked on the Java source code file so as to locate all annotations present in the source code, if any. The located annotations are then processed by the associated processors such that one processor owns only one annotation, and class files and/or new Java source files are generated. If processing an annotation has resulted in generating a new source file, APT is invoked recursively until the of invoking APT no longer results in generating a new source file. The default behavior of APT is to parse all source files even if only a single file changed. The only way APT does nothing is if all the class file timestamps are later than the source file timestamps. Thus, the reprocessing of annotations occurs every time a modification to the source file causes the time stamp of the source file to be later than the time stamp of the class file. More specifically, the latter cycle is repeated every time a modification is made to the Java source code irrespective of the type of the modification (e.g., adding or deleting a comment and/or space) or the extent of the modification to the source code or any of the annotations.

Several limitations can be associated with the invoking of APT each time the source is modified. One of such limitations is that the compilation cycle is unnecessarily increased because some of the annotation processors are unnecessary re-executed. For instance, annotations in the source code are reprocessed by the associated processors, and thus compiled, even though none of the annotations have been modified or affected, directly or indirectly by the changes. Alternatively, all the annotations are reprocessed even though modifications to the source code may have involved minimal changes maybe to one or few of the annotations. It should be considered that many annotations in the source file will not be affected by a large class of changes (implementation, comments, and whitespaces). Thus, most changes will not affect the annotations and will therefore not require running of the associated annotation processors which have an undetermined effect on the compilation speed. It should be appreciated that the reprocessing of unmodified or unaffected annotations increases compilation time, thus negatively affecting the software development cycle, reducing developer productivity, and wasting computing resources.

In view of the foregoing, a solution is needed for enhancing the software development process through reduction of compilation cycles by selectively limiting the annotations to be reprocessed when a modification is made to the source code or annotation.

SUMMARY

Broadly speaking, the present invention fills these needs by providing methods, systems, and apparatus capable of enhancing a software development process by reducing the compilation cycle. This enhancement can further be customized by specifying different policies based on the given annotations. These policies dictate the granularity of determining when to process the annotations. In one embodiment, the compilation cycle is reduced through intelligently limiting annotation processors to be re-executed when a software program is modified.

It should be appreciated that the present invention can be implemented in numerous ways, such as a process, an apparatus, a system, a device, a method, and a set of program instructions stored on a computer readable medium. Several inventive embodiments of the present invention are described below.

In one embodiment, a method for selecting an annotation processor associated with an annotation for reprocessing based on each source file's annotation snapshot is provided. An annotation snapshot consists of hash values that represent the effective values of each annotation that are present in the associated source file. Each hash value is calculated based not only on the annotation but also on the structural source members to which the annotation is attached. To determine if a processor needs to be rerun on any of the annotations in a source file, the annotation's hash value is calculated and compared with the hash value stored in the snapshot file. If the values differ, the processor for the annotation is invoked.

In another embodiment, an incremental processing system capable of operating on a computer software source code is provided. The system includes an incremental annotation processing tool (APT) which acts as an interceptor that filters through the annotation list and only invokes the processors for annotations that have effectively changed. An incremental modification detecting tool (IMDT) is configured to mark an annotation processor assigned to execute an annotation for reprocessing. The APT is capable of invoking the marked annotation processor.

Other aspects of the invention will become apparent from the following detailed description, taken in conjunction with the accompanying drawings, illustrating by way of example the principles of the invention.

BRIEF DESCRIPTION OF THE DRAWINGS

FIG. 1C is a table depicting the hash values associated with each annotation set in the source file depicted in FIG. 1A, in accordance with one embodiment of the present invention;

FIG. 1D is a table depicting the hash value associated with the source file depicted in FIG. 1A, in accordance with another embodiment of the present invention;

FIG. 3B is a table depicting the hash values associated with each annotation set in the source file depicted in FIG. 3A, in accordance with another embodiment of the present invention;

FIG. 3C is a table depicting the hash value associated with members of annotation set A.1 depicted in FIG. 3A in accordance with another embodiment of the present invention.

DETAILED DESCRIPTION

Figure 1A:
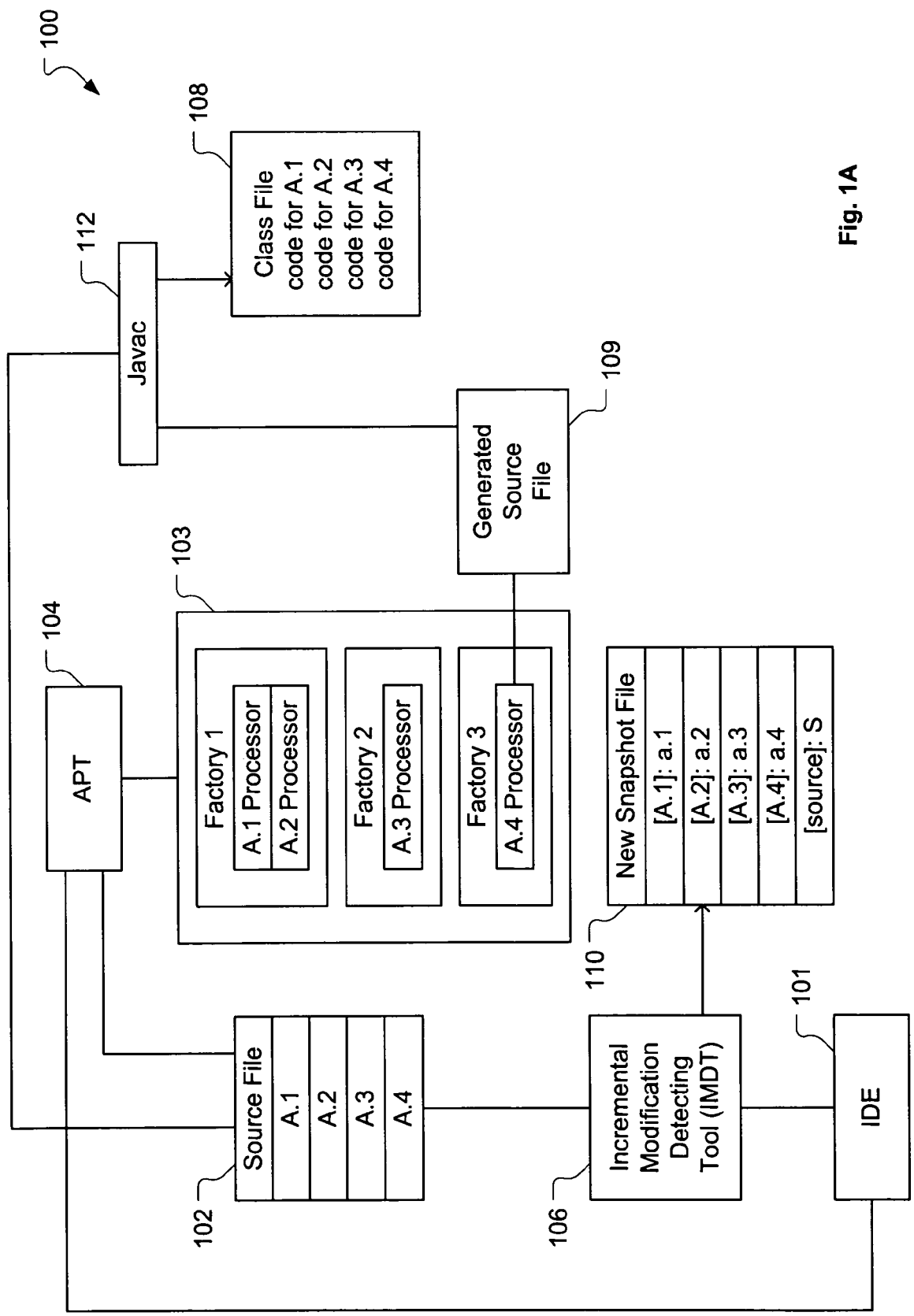
FIG. 1A is a simplified block diagram illustrating an incremental processing system, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

One of ordinary skill in the art must recognize and appreciate that although specific reference may have been made to terminology defined by Sun Microsystems, Inc., it should be understood that any name could be used for such terms, so long as the desired functionality is achieved.

Various embodiments for methods, systems, and apparatus for intelligently selecting annotation processors to be re-executed when a modification is made to a source code or an annotation, are provided. According to one embodiment, the present invention provides an incremental modification detecting tool (hereinafter referred to as "IMDT") capable of incremental code re-generation. The IMDT of the present invention has the capability of intelligently limiting the annotation processors to be executed to processors associated with annotations affected by a modification since the last invocation of the IMDT. In this manner, the IMDT of the present invention substantially reduces the time associated with reprocessing of unchanged or unaffected annotations. In one example, the IMDT of the present invention is implemented in conjunction with an annotation processing tool (APT) and Javac so as to incrementally process annotations. According to one aspect, the IMDT of the present invention is capable of detecting any changes to the structural information of the source code or annotations through the use of hash values.

As referred to in the present invention, annotations operate to associate an arbitrary attribute with declarations. As such, annotations can be implemented to modify any declaration (e.g., class, interface, method, variable, parameter, fields, etc.). According to one example, annotations are configured to precede other modifications associated with a declaration. In one aspect, annotations can consist of an at-sign "@" followed by an annotation type and an optional list of value pairs. In one example, annotations provide information as to how a declaration is to be processed by development tools (e.g., APT), deployment tools (e.g., Java EE 5 Reference Implementation, Application Server 9, etc.), or run-time libraries. Source annotations are always available at development time. However, some annotations may also be available at runtime. For instance, a run-time annotation is defined in a class file, and as such, can be implemented using the Standard Java Reflection API at runtime.

In one embodiment, the IMDT of the present invention can be implemented in an environment implementing the Java programming language 5.0 (Java 5.0), as developed by Sun Microsystems, Inc. Java 5.0 implements an annotation facility (also referred to as metadata facility) to tag language constructs (e.g., class, method, etc.) with additional data. The additional data can then be processed by an annotation-aware utility. In one example, the annotation facility includes syntax for declaring annotation types, syntax for annotating declarations, APIs for reading annotations, a class file representation for annotations, and an annotation processing tool (APT). The annotation facility further allows software program developers to define annotation types, use the defined annotation types in Java programs, and determine whether the annotations can be used during compile time or runtime. In this manner, instead of the software developers implementing detailed code to accomplish a given task, the given task can be achieved by modifying methods, classes, and fields with metadata annotations.

The APT is an exemplary annotation processing utility introduced by Sun Microsystems, Inc. in Java 2 Standard Edition (J2SE) 5.0. The APT is a command-line processing tool capable of finding and executing annotation processors based on the annotations present in a set of specified source files being examined. The annotation processors use a feature similar to reflection to access annotation declarations. However, this feature used by the annotation processor is not strict reflection as the files have not been compiled yet and some annotations may not be available at runtime.

In one instance, the APT is implemented in an integrated development environment (IDE) (also referred to as integrated design environment and integrated debugging environment) so as to assist computer programmers to develop software. The IDE includes a source code editor, a compiler and/or interpreter, build-automation tools, and a debugger. The IDE further includes a version control system and various tools to simplify the construction of graphical user interfaces (GUIs). The IDE can also include a class browser, an object inspector, and a class hierarchy diagram, for use with object oriented software development. The IDE provides a large number of features for authoring, modifying, compiling, deploying, and debugging software. In this manner, the IDE enhances the development cycle by increasing productivity.

In accordance with one example, the IDE invokes the APT on a source file being compiled. First, the APT finds the annotations present and thereafter runs the annotation processors capable of producing new source code and other files. Then, the APT directs compilation of the original source file as well as the generated source files. In one aspect, the APT operates on a Java source file to create additional code elements specified by the annotations. Thereafter, the APT compiles the source files, along with any service definitions, into a class file. More detail description of the APT is provided below with respect to FIGS. 1A-2C.

FIG. 1A illustrates a simplified block diagram of an incremental processing system 100, in accordance with one embodiment of the present invention. The system 100 includes an IDE 101, an incremental modification detecting tool (IMDT) 106, an APT 104, and Javac 112. In the illustrated embodiment, a source file 102 and a generated source file 109 have been compiled into a class file 108. As will be described in more detail below, the illustrated embodiment depicts the first invocation of the IMDT 106 and APT 104 on the source file 102.

According to one embodiment of the present invention, IMDT 106 operates on the source file 102 so as to generate a snapshot of the source file 102 capturing a state of the source file 102 during the first invocation of the IMDT 106. In one instance, IMDT 106 is designed to generate the snapshot at the time the source file 102 is being saved. According to one aspect, the snapshot is stored to the snapshot file 110. However, in another embodiment, the snapshots of the source code and the annotations may be stored to a data base, table, etc. The set of all files that are referenced by the processor is included in the snapshot. A processor is run again if any of the files in its set has changed structurally, or the set of files has changed, or any annotation has changed.

In one example, IMDT 106 captures the state of annotation sets by generating a hash value corresponding to each of the annotation sets A.1 through A.4, as well as a hash value for the source file 102. It should be understood that the annotation set is the recognized annotations for the associated processor. According to one aspect, the hash values S and a.1 through a.4 are configured to capture the structural information of the source file 102 as well as the structural information of the corresponding annotation set A.1 through A.4. As will be described in more detail below, the hash values a.1 through a.4 and S stored to the snapshot file 110 will be used by IMDT 106 if the source file 102 is saved again during the development cycle (i.e., when the time stamp of the source file 102 is later than the time stamp of the class file 108). Additional information with respect to the components of the IMDT 106 and the capturing of the snapshots and generation of hash values is provided below with respect to FIGS. 1B through 3C.

In accordance with one embodiment, once the incremental processing system 100 of the present invention commences operation, IMDT 106 is invoked so as to determine whether any of the annotations present in the source file 102 have been modified. The IMDT 106 works as a single dispatcher processor within the APT 104, so the source scanning and access is provided through the existing APT 104 APIs. Building the tree of information (parsing) is done by the APT 104. The IMDT 106 is responsible for determining which processors need to run and dispatching to the appropriate processor. Thus, the IMDT 106 is the delegating factory. In one aspect, the IMDT 106 starts by scanning the source file 102. In the illustrated embodiment, upon searching the source file 102, the IMDT 106 locates four annotation sets A.1 through A.4. In one embodiment, the annotation sets A.1 through A.4 are class level annotations (i.e., the IMDT 106 and the APT 104 are being invoked on a source file associated with a class). However, one of ordinary skill in the art should appreciate that in a different embodiment, the annotation sets A.1 through A.4 maybe selected so as to modify any declaration type (e.g., methods, fields, etc.).

In one example, upon locating the annotation sets A.1 through A.4, the IMDT 106 captures the state of the annotation sets and generates the corresponding hash values a.1 through a.4. In the same manner, the IMDT 106 captures the state of the source code, and generates the hash value S. As this is the first invocation of the IMDT 106 and the APT 104, annotation processors associated with each of the annotation set A.1 through A.4 will be marked and thus re-executed.

Once annotation sets A.1 through A.4 have been located, the IMDT 106 starts searching for annotation factories developed by the developer, which in the illustrated embodiment are factories 1 through 3 defined in 103. In one example, a factory refers to how a developer creates an annotation processor for processing an associated annotation. The software developer has an option of using an existing annotation processor or using a factory to create a new processor to process an annotation. That is, the developer has the option of creating the annotation processors directly, or indirectly through the use of factories.

Next, the factories 1 through 3 are queried by the IMDT 106 so as to determine which annotations are processed by each of the factories. At this point, the IMDT 106 determines that annotation sets A.1 and A.2 are processed by the factory 1, annotation set A.3 is processed by the factory 2, and annotation set A.4 is processed by the factory 3. Once all the annotation sets A.1 through A.4 are claimed (e.g., an annotation is considered "claimed" if the annotation is processed by a factory), the IMDT 106 calls the factories 1 through 3, passing in the sets of annotations A.1 through A.4. Then, each of the factories 1 through 3 returns the corresponding appropriate processor for the claimed annotations. For instance, factory 1 is configured to return the A.1 processor to process the annotation set A.1, and the A.2 processor to process the annotation set A.2. In the same manner, the factory 2 is configured to return the A.3 processor to process the annotation set A.3, and the factory 3 is configured to return the A.4 processor to process the annotation A.4.

The APT 104 will find the factories that are registered for annotations and provide the dispatching. The APT 104 also allows a single factory to be specified. The existing single factory capability is used and, based on these algorithms, dispatching is provided to other registered factories. This process is transparent to the end user and does not require changing the APT 104 internally, thus only a different configuration is needed. Once all the A.1 through A.4 processors have been returned by the respective factories 1 through 3, the APT 104 is invoked so as to call each of the processors in turn. The APT 104 starts by calling the A.1 processor followed by the A.2 processor. In the same manner, the A.3 processor is called to process the annotation set A.3. As depicted, the processing of the annotation sets A.1, A.2, and A.3 does not result in generating any new source file.

The APT 104 then calls the A.4 processor to process the annotation set A.4. As shown, the processing of the annotation set A.4 has resulted in the generated source file 109. At this point, because one of the processors (i.e., the A.4 processor) has generated a new source file, the APT 104 is invoked recursively. That is, the APT 104 searches through the generated source file 109 so as to determine whether any annotations are present. In the illustrated embodiment, however, the generated source file 109 does not include any annotations.

As operating the APT 104 on the generated new file 109 has not resulted in more generated source files, the APT 104 proceeds to invoke the Javac 112 on the source file 102 and the generated source file 109. That is, in one example, Javac 112 is run once generation of additional source code has been exhausted. By invoking the Javac 112, the source file 102 and the generated source file 109 are compiled into the class file 108. As can be seen, the class file 108 includes the code for annotation sets A.1 through A.4.

One of ordinary skill in the art must appreciate that although in the illustrated embodiment the generated source file 109 did not include any additional annotation sets or annotations, in a different embodiment, the generated source file 109 can include annotations. In such a scenario, the APT 104 will query the factories for the appropriate processor and will ultimately pass the located annotation or annotation set to the appropriate processor. In this manner, recursively invoking the APT 104 is continued until processing of an annotations set by a processor does not generate any new source files.

Figure 1B:
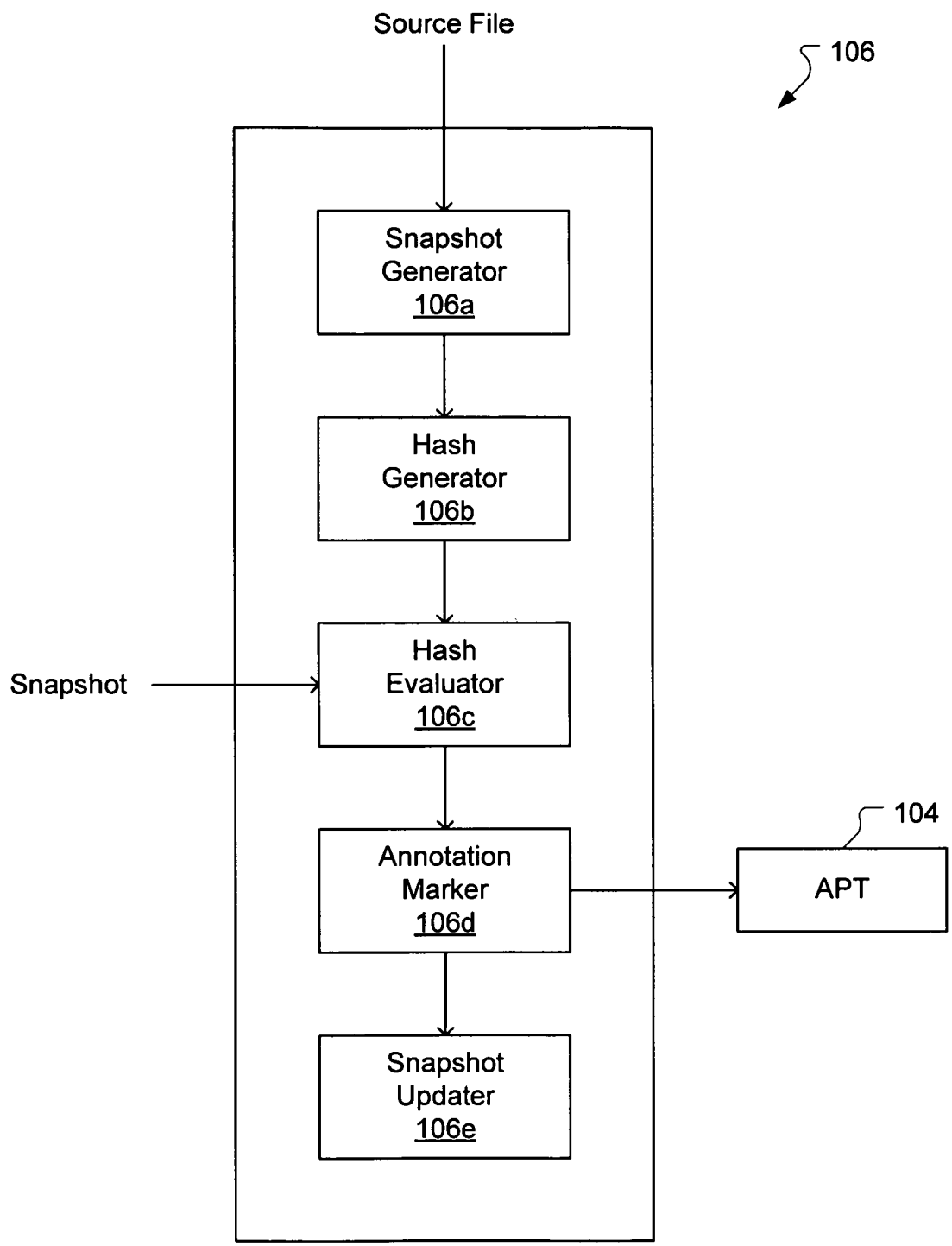
FIG. 1B is a simplified block diagram illustrating exemplary components of an exemplary incremental modification detector, in accordance with another embodiment of the present invention.

FIG. 1B is a block diagram depicting components of an exemplary IMDT 106, according to one embodiment of the present invention. As illustrated, the IMDT 106 includes a snapshot generator 106*a*, a hash generator 106*b*, a hash evaluator 106*c*, an annotation marker 106*d*, and a snapshot updater 106*e*. In the illustrated embodiment, the snapshot generator 106*a* operates to capture the snapshot of annotation sets as well as the source file. According to one instance, each of the annotation sets and the source file has a snapshot entry in the snapshot file 110. Each snapshot entry captures the state of the corresponding annotation set and the source file 102. Thereafter, the hash generator 106*b* is invoked so as to generate a hash value for each of the snapshot entries.

Once snapshots of annotation sets and the source file have been generated, the hash evaluator 106c is invoked so as to compare hash values of corresponding snapshot entries in an existing snapshot file with the snapshot file 110, if an existing snapshot file exists. In the illustrated embodiment, being the first invocation of the IMDT 106, an existing snapshot does not exist. As such, calling of the hash evaluator 106c results in determining that all of the hash entries generated by the hash generator 106d have been modified. As such, the annotation marker 106d is called so as to mark all of the processors associated with the annotation sets A.1 through A.4 for processing by the APT 104. Thereafter, the snapshot updater 106e is configured to replace the existing snapshot (if one exists) with the snapshot file 110.

FIGS. 1C and 1D are simplified tables correspondingly depicting the generation of hash values associated with each annotation set A.1 through A.4 as well as the source file, in accordance with one embodiment of the present invention. As shown, the annotation set A.1 includes annotations B, C, and D. Thus, in accordance with one embodiment of the present invention, the hash value a.1 of the annotation set A.1 is the aggregation of the hash values b, c, and d corresponding to annotations B, C, and D, respectively. In the same manner, the annotation set A.2 includes annotations E and F, the annotation set A.3 includes the annotation G, and annotation set A.4 includes annotations H and I. Thus, the hash values a.2, a.3, and a.4 are correspondingly the aggregation of the hash values of E and F, G, and H and I. Thus, in a coarse granularity, as shown in the illustrated embodiment, any changes to the aggregate hash value are detected. As such, changes to the aggregate hash value results in regeneration of all the processors associated with the individual annotations within each of the annotation sets.

In another example, however, as will be described below, when finer granularity is desired, the IMDT 106 of the present invention has the capability of capturing the snapshot of each individual annotation within the annotation set or the source code, thus generating a hash value for each individual annotation. In this manner, addition, deletion, or modifications of a single annotation in the annotation set or the source code causes the hash value associated with the single annotation to change. As a result, the APT 104 of the present invention is only invoked on the processor associated with a single annotation as opposed to all the annotation processors associated with all the annotations within the annotation set. Additional information with respect to the hash value associated with each attribute is provided below with respect to FIGS. 3B and 3C.

As shown in FIG. 1D, the IMDT 106 of the present invention also captures the snapshot of the source file 102. In one example, the hash value S of the source reflects the combination of the hash values associated with all of the structural information of the source file. For instance, in one embodiment, the structural information of the source includes the non-annotation code in the source file. For instance, in a Java source code file, the structural information of the source code includes the Java code elements. For instance, the signature of the class(es), the signatures of the methods, the signatures of the fields, etc., are considered Java code elements. Additionally, spaces, brackets, comments, and actual implementations are not considered to be structural information, and as such, are not considered in the generation of the hash value S.

According to one embodiment, the hash value of an annotation is the sum of the hash values of the annotation members. In one example, the hash value of an annotation member includes the hash value of the annotation member name (e.g. a string value) XOR the hash value of the annotation member value. In one example, the hash value may depend on the type of the annotation member value. In one aspect, annotation member values can be byte, character, double, float, integer, long, short, Boolean, array, string, enum, class, etc. In accordance with one embodiment, cyclic redundancy check (CRC) may be implemented to generate the hash values for the source code and the annotation snapshots.

In one instance, the generation of hash values associated with the source file and the annotations can be understood with reference to the example provided below in Table 1:

TABLE 1

Exemplary Annotation Set of an Exemplary Java Class

@webservice
public class C {
   @webmethod
      public void method (int I) {
   }
}

In the illustrated example, the hash value for the annotation set including the annotations @webservice and @webmethod is the sum of the hash value generated for @webservice and the hash value generated for the @webmethod. In turn, the hash value of the @webservice is the sum of the hash values for the webservice and the hash value generated for the structural information of the class "C." Similarly, the hash value of the @webmethod is the sum of the hash value of the webmethod and the hash value generated for the structural information of the method "method." In one exemplary aspect, a string representation may be used when generating each of the hash values. In such an exemplary implementation, when generating the hash values for the structural information of the members, items such as spaces, brackets, and the ordering of modifiers such as final, synchronized, etc., are ignored. In this manner, the addition or deletion of a space in the method will not change the hash value of the method, while a change to the signature of the method can result in the generation of a new hash value.

In accordance with one embodiment, the capturing of the annotations and source file snapshots, the generating of hash values for the annotations and the source file, the implemented hash algorithm, the comparing of the generated hash values, and the determination of which annotation processor(s) are to be re-executed are illustrated below in Table 2.

TABLE 2 package sun;
import com.sun.mirror.apt.AnnotationProcessor;
import com.sun.mirror.apt.AnnotationProcessorEnvironment;
import com.sun.mirror.apt.AnnotationProcessorFactory;
import com.sun.mirror.declaration.AnnotationMirror;
import com.sun.mirror.declaration.AnnotationTypeDeclaration;
import com.sun.mirror.declaration.AnnotationTypeElementDeclaration;
import com.sun.mirror.declaration.AnnotationValue;

TABLE 2-continued

```
import com.sun.mirror.declaration.Declaration;
import com.sun.mirror.declaration.MemberDeclaration;
import com.sun.mirror.declaration.TypeDeclaration;
import com.sun.mirror.util.SourcePosition;
import java.io.BufferedInputStream;
import java.io.BufferedOutputStream;
import java.util.Set;
import java.io.File;
import java.io.FileInputStream;
import java.io.FileOutputStream;
import java.io.IOException;
import javaio.InputStream;
import java.io.OutputStream;
import java.util.Collection;
import java.util.HashMap;
import java.util.Map;
import java.util.Properties;
/**
 *
 * @author
 */
public class AllDeclarationComparisonStrategy implements ProcessorExecutionStrategy {
        /**
         * In one example, source files (java.io.File) are mapped with corresponding
Properties that contain annotation hashes
        */
        private HashMap<File, Properties> annotatedFiles = null;
        private AnnotationProcessorFactory factory;
        public boolean needsToExecute(Set<AnnotationTypeDeclaration> annotations,
              AnnotationProcessorFactory factory, AnnotationProcessorEnvironment
environment) {
                boolean execute = false;
                try{
                        this.factory = factory;
                        initialize(annotations, environment);
                        execute = hasChanged( );
                } catch(IOException e) {
                        throw new RuntimeException(e);
                }
                return execute;
        }
        private void initialize(Set<AnnotationTypeDeclaration> annotations,
              AnnotationProcessorEnvironment environment) throws IOException{
                annotatedFiles = new HashMap<File, Properties>( );
                for(AnnotationTypeDeclaration annotation: annotations) {
                        Collection<Declaration> decls =
                                environment.getDeclarationsAnnotatedWith(annotation);
                        for(Declaration decl: decls) {
                                SourcePosition sp = decl.getPosition( );
                                File sourceFile = sp.file( );
                                Properties snapShot = annotatedFiles.get(sourceFile);
                                if(snapShot == null) {
                                        snapShot = new Properties( );
                                        annotatedFiles.put(sourceFile, snapShot);
                                }
                                snapShot.put(getKey(annotation, decl),
                                        getHash(annotation, decl));
                        }
                }
        }
        private boolean hasChanged( ) throws IOException{
                //In one embodiment, compares the snapshots.
                final Set<File> sourceFiles = annotatedFiles.keySet( );
                boolean changed = false;
                for(File sourceFile: sourceFiles) {
                        final File snapShotFile = getSnapShotFile(sourceFile);
                        if(!snapShotFile.exists( )) {
                                snapShotFile.createNewFile( );
                        } // In one aspect, timestamp checks can be added so that files
                        // having the timestamp greater than the source file can be ignored.
                        Properties lastSnapShot = new Properties( );
                        //In one aspect, loads the snapshot that is on disk.
                        InputStream is = null;
                        OutputStream os = null;
                        try {
                                is =
                                        new BufferedInputStream(
                                        new FileInputStream(snapShotFile));
                                lastSnapShot.load(is);
                                is.close( );
```

TABLE 2-continued

```
                    //get the snapshot that is in the map
                    final Properties newSnapShot = annotatedFiles.get(sourceFile);
                    if(!last SnapShot. equals(newSnapShot)) {
                            //update snapshot file
                            os = new BufferedOutputStream(
                                    new FileOutputStream(snapShotFile));
                            newSnapShot.store(os, "");
                            changed = true;
                    }
            } catch (IOException ioe) {
                    changed = true;
            } finally {
                    if (is != null) {
                            is.close( );
                    }
                    if (os != null) {
                            os.close( );
                    }
            }
        }
        return changed;
    }
    private String getLeafName(File file) {
        String leafName = file.getName( );
        //remove the suffix
        leafName = leafName.substring(0, leafName.lastIndexOf(".")) +
                factory.getClass( ).getSimpleName( );
        return leafName;
    }
    private File getSnapShotFile(File sourceFile) {
        return new File(sourceFile.getParentFile( ), getLeafName(sourceFile) +
".snapshot");
    }
    private String getKey(AnnotationTypeDeclaration annotation, Declaration decl) {
        String key = "";
        String annotationName = annotation.getQualifiedName( );
        if(decl instanceof TypeDeclaration) {
            key = ((TypeDeclaration)decl).getQualifiedName( )+ annotationName;
        } else if(decl instanceof MemberDeclaration) {
            key =
((MemberDeclaration)decl).getDeclaringType( ).getQualifiedName( )+ "."+
                            decl.getSimpleName( ) + "." + annotationName;
        }// else if (decl instanceof )
        return key;
    }
    private String getHash(AnnotationTypeDeclaration atd, Declaration decl){
        Collection<AnnotationMirror> mirrors = decl.getAnnotationMirrors( );
        AnnotationMirror theMirror = null;
        for (AnnotationMirror mirror : mirrors) {
            if (mirror.getAnnotationType( ).getDeclaration( ).equals(atd)) {
                    theMirror = mirror;
            }
        }
        if (theMirror == null) {
            throw new RuntimeException("Can't find instance of"+
atd.getSimpleName( ));
        }
        Map<AnnotationTypeElementDeclaration, AnnotationValue> map =
theMirror.getElementValues( );
        StringBuilder sb = new StringBuilder( );
        for (AnnotationValue v : map.values( )) {
            sb.append(v.getValue( ).toString( ));
        }
        return sb.toString( );
    }
}
```

Figure 2:
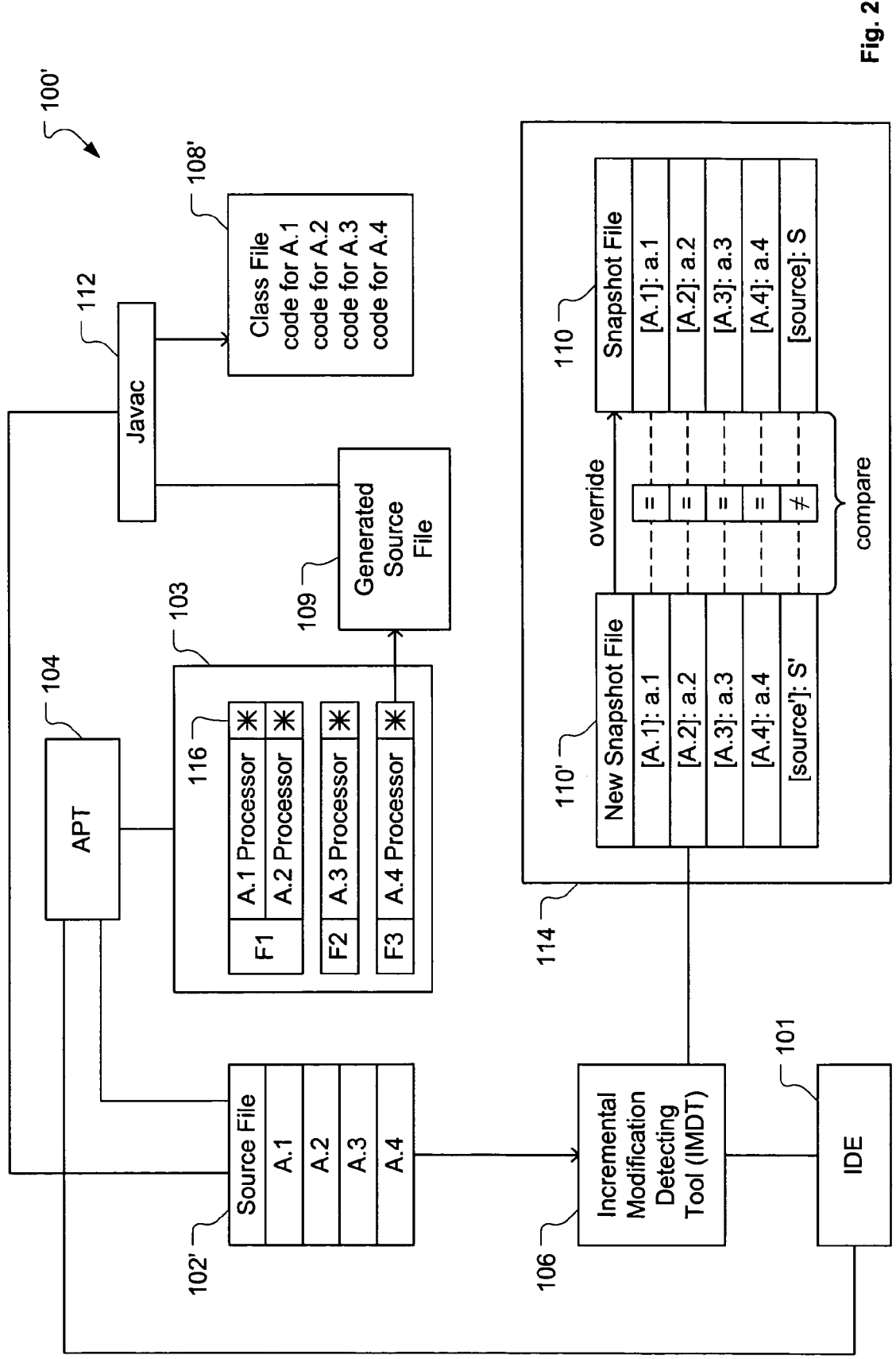
FIG. 2 is a simplified block diagram depicting the incremental processing system operating on a modified source file, in accordance with another embodiment of the present invention.

Reference is made to FIG. 2 depicting another incremental processing system 100' operating on a source file 102', according to one embodiment of the present invention. In the illustrated embodiment, the source file 102' depicts the source file 102 shown in FIG. 1A subsequent to being modified. According to one aspect, once the source file 102' is being compiled, the IMDT 106 of the present invention is invoked on the source file 102' so as to generate the snapshot of the source code 102'.

As described in more detail above with respect to FIG. 1A, the IMDT 106 is invoked so as to search the source file 102' to find annotation sets defined in the source file 102'. Once the annotation sets A.1 through A.4 have been located, snapshots of the annotation sets A.1 through A.4 are generated and stored to a new snapshot file 110'. Thereafter, hash values are generated so as to correspondingly represent the structural information of the annotation sets A.1 through A.4 as well as the structural information of the source file 102'. In the illustrated embodiment, the new snapshot file 110' includes hash values a.1 through a.4 corresponding to each of the annotation sets A.1 through A.4 as well as a hash value of S' corresponding to the source file 102'.

At this point, the existing snapshot file 110 associated with invocation of the IMDT 106 on the source file 102 (i.e., the snapshot associated with the first invocation of the IMDT 106) is retrieved from persistent storage 114. According to one embodiment, the IMDT 106 of the claimed invention operates to compare the hash values a.1 through a.4 associated with the annotation sets A.1 through A.4, as stored to the new snapshot file 110', with the hash values a.1 through a.4, also corresponding to annotation sets A.1 through A.4, as stored to the existing snapshot file 110.

By comparing the corresponding hash values, a determination can be made as to whether any of the corresponding hash values have changed. For instance, the hash value a.1 of the annotation set A.1, as stored to the new snapshot file 110', is compared with the hash value a.1 of the annotation set A., as stored to the snapshot file 110. As the two hash values are equivalent, a determination is made that the no structural modification has been made to the annotation set A.1. Following the same logic, a determination is made that none of the hash values associated with the annotation sets A.2 through A.4 has been changed, thus establishing that no structural modifications have been made to annotation sets A.2 through A.4.

Lastly, the IMDT 106 is configured to compare the hash value S' associated with the source file 102', as stored to the new snapshot file 110', with the hash value S associated with the source file 102, as stored to the existing snapshot file 110. The comparison of the two hash values S and S' establishes that modifications have been made to the structural information of the source file 102', thus requiring that the APT 104 be invoked on all the annotations A.1 through A.4 in the source file 102'. In one aspect, prior to invoking the APT 104, the IMDT 106 operates so as to override the existing snapshot file 110 with the new snapshot file 110' (i.e., the snapshot generated as a result of invocation of the IMDT 106 on the source file 102' (i.e., the source file 102, as modified)). It should be appreciated, however, that in another embodiment, the IMDT 106 may only replace the hash value of the source file S with the S', instead of replacing all the snapshot entries in the snapshot file.

In accordance with one embodiment of the present invention, once the IMDT 106 has determined that modifications have been made to the structural information of the source file 102', the IMDT 106 marks the annotation processors corresponding to all annotation sets A.1 through A.4 so as to ultimately generate the class file 108'.

Figure 3A:
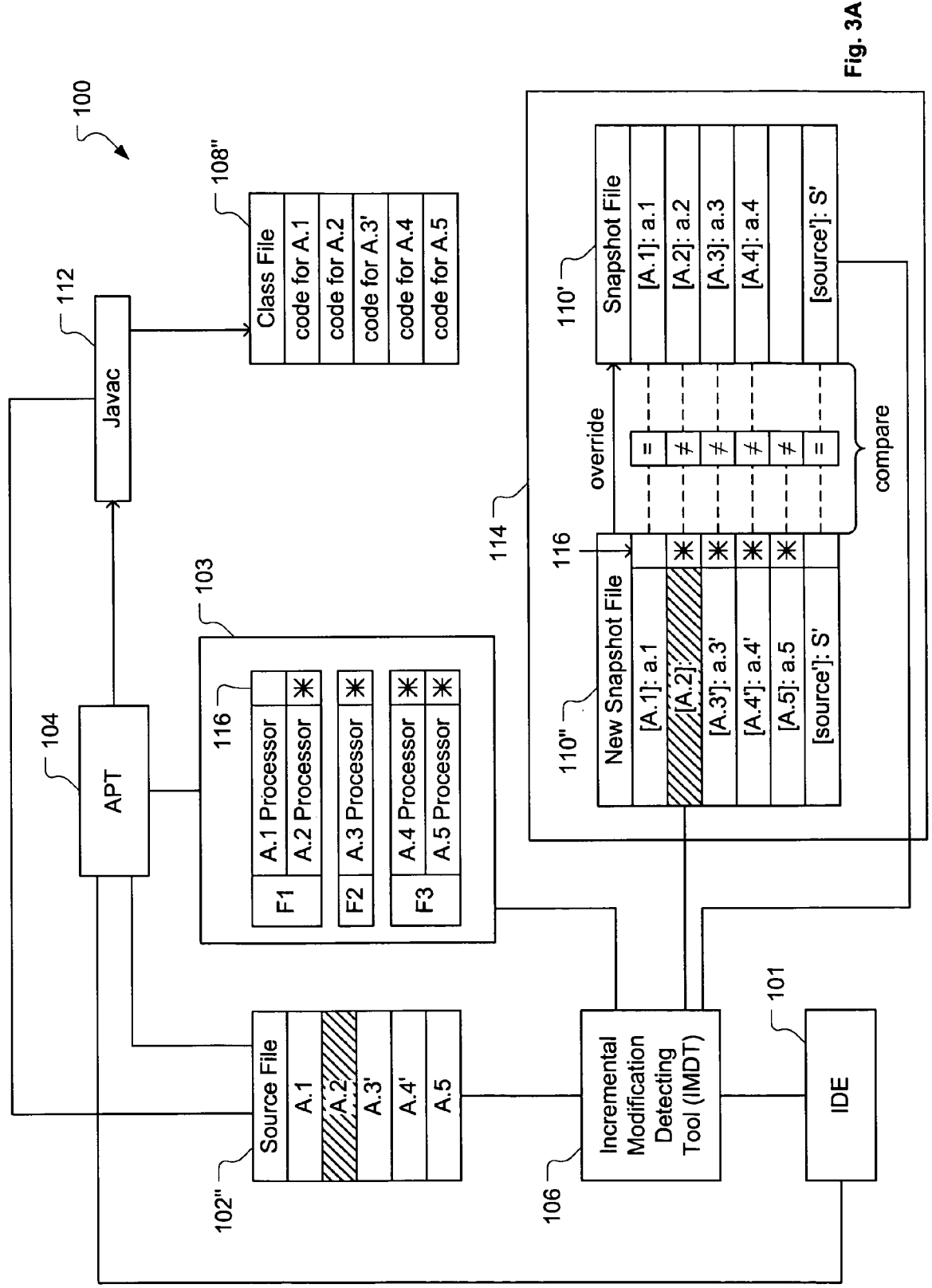
FIG. 3A is a simplified block diagram depicting the incremental processing system operating on a modified source file, in accordance with another embodiment of the present invention.

FIG. 3A further illustrates the capability of the IMDT 106 of the present invention to invoke the APT 104 only on structurally modified annotation sets, in accordance with one aspect of the present invention. In the illustrated embodiment, a source file 102" has been generated due to the modifications to the source file 102' depicted in FIG. 2. As can be seen, the source file 102" does not include the annotation set A.2 and a new annotation set A.5 has been added (for ease of understanding, the annotation set A.2 is shown to have been crossed out). Furthermore, the annotation sets A.3 and A.4 have been modified, as represented by the annotation sets A.3' and A.4'. As will be described in more detail below, one embodiment of the present invention invokes the APT 104 only on the modified, deleted, and/or added annotation sets. In this manner, one embodiment of the present invention reduces the number of compilation cycles and minimizes waste of resources and the time associated with reprocessing of all the annotation sets in a source file when only one or two of the annotation sets have been modified.

As illustrated, the IMDT 106 is invoked on the source file 102" and a new snapshot file 110" is generated. As described in more detail above with respect to FIGS. 1A and 2, the IMDT 106 searches through the source file 102' locating the annotation sets A.1, A.3', A.4', and A.5. As described in more detail above, the new snapshot 110" captures the structural information of each annotation set A1, A.3', A.4' and A.5 as well as the source file 102" at the time the source file 102" is being saved. In the illustrated embodiment, the structural information is represented using hash values a.1, a.3', a.4', a.5, and S' (for ease of understanding, the snapshot entry corresponding to annotation set A.2 is shown crossed-out).

In one embodiment, the corresponding snapshot entries in the snapshot file 110' associated with invocation of the IMDT 106 on the source file 102' as well as the new snapshot file 110", associated with the invocation of IMDT 106 on the source file 102", are correspondingly compared. The IMDT 106 of the claimed invention operates to compare the hash values a.1, a.3', a.4', a.5 associated with the annotation sets A.1, A.3', A.4', and A.5, as stored to the new snapshot file 110", with the hash values a.1, a.2, a.3, and a.4 corresponding to annotation sets A.1, A.3, and through A.4, as stored to the existing snapshot file 110'.

In the illustrated embodiment, not all the hash values have changed. For instance, the hash value a.1 of the annotation set A.1, as stored to the new snapshot file 110", is equivalent to the hash value a.1 of the annotation set A.1, as stored to the snapshot file 110'. Thus, a decision is made that the structural information of the annotation set A.1 has not been modified. However, the hash values a.3' and a.4' of the annotation sets A.3' and A.4', respectively, as stored to the new snapshot file 110", are different from the hash values a.3 and a.4 of the annotation sets A.3 and A.4, as stored to the snapshot file 110'. As such, a determination is made that the structural information of the annotation sets A.3' and A.4' are not the same. Therefore, the IMDT 106 marks the processors A.3 and A.4 associated with annotations sets A.3 and A.4 for reprocessing, as illustrated by the asterisk mark 114.

As can be seen, the new snapshot file 110" further includes a hash value a.5 for the annotation set A.5, while the existing snapshot 110' does not include a hash value for the annotation set A.5. Furthermore, the new snapshot file 110" does not include a hash value for the annotation set A.2 whereas the snapshot file 110' has a hash value associated with the annotation set A.2. In one embodiment, having a hash value for a new set of annotations or not having a hash value for an existing set of annotation is an indication of a change in the hash value associated with the annotation set, and thus a modification to the structural information of the annotation set. Consequently, processors configured to execute annotation sets meeting such criteria are marked by the IMDT 106 for reprocessing. In the illustrated embodiment, annotation sets A.2 has been marked for reprocessing. Furthermore, a processor A.5 is marked to process the new annotation set A.5.

In the same manner, the IMDT 106 is configured to compare the hash value S' associated with the source file 102", as stored to the new snapshot file 110", with the hash value S' associated with the source file 102', as stored to the existing snapshot file 110'. The comparison of the two hash values S and S' establishes that two hash values are equivalent, establishing that no modifications have been made to the structural information of the source file 102". In one embodiment, once the annotation sets in the new snapshot 110" have been compared with the corresponding annotation sets in the existing snapshot 110', the existing snapshot file 110' is overridden by the new snapshot file 110".

Thereafter, the APT 104 is invoked so as to process the annotation set A.5 and reprocess annotation sets A.3 and A.4. For instance, the factory 3 includes an A.5 processor. As such, the factory 3 is shown to have claimed the annotation set A.5, and the annotation set A.5 is processed by the A.5 processor. For additional information with respect to processing and reprocessing of annotation sets by the respective annotation processors and the generation of the class file 108", reference can be made to descriptions provided with respect to FIGS. 1 and 2.

Reference is made to the simplified tables depicted in FIGS. 3B and 3C, illustrating the change in hash values resulting from structural information modifications of the annotation sets depicted in FIG. 3A, in accordance with one embodiment of the present invention. As can be seen, because the annotation set A.2 has been deleted, a hash value has not been associated with the annotation set A.2. Of course, in a different embodiment, the IMDT 106 may be configured to assign a predetermined hash value to a deleted annotation and/or annotation set.

As can be seen, the hash value associated with the annotation set A.3' is configured to be the sum of the hash values associated with annotations G, J, and K. In the same manner, the hash value associated with the annotation set A.4' now only depends on the hash value associated with the annotation H. Furthermore, the hash value associated with the annotation set A.5 is the aggregate of the hash values associated with annotations L and M. A comparison of the tables in FIGS. 1C and 3B reveals the capability of the IMDT 106 to detect the addition or deletion of annotations or annotation sets by using the presence or lack thereof in the snapshot files.

The table depicted in FIG. 3C illustrates the generation of the hash value a.1 associated with the annotation set A.1. As shown, the hash value associated with the annotation set A.1 is the aggregate of the hash values associated with the structural information of the member annotations B, C, and D, respectively. For instance, the hash value b reflects the structural information of the annotation B (e.g., class declarations, methods, fields, local variables, etc.). In one example, the comments are not considered to reflect the structural information.

Figure 4:
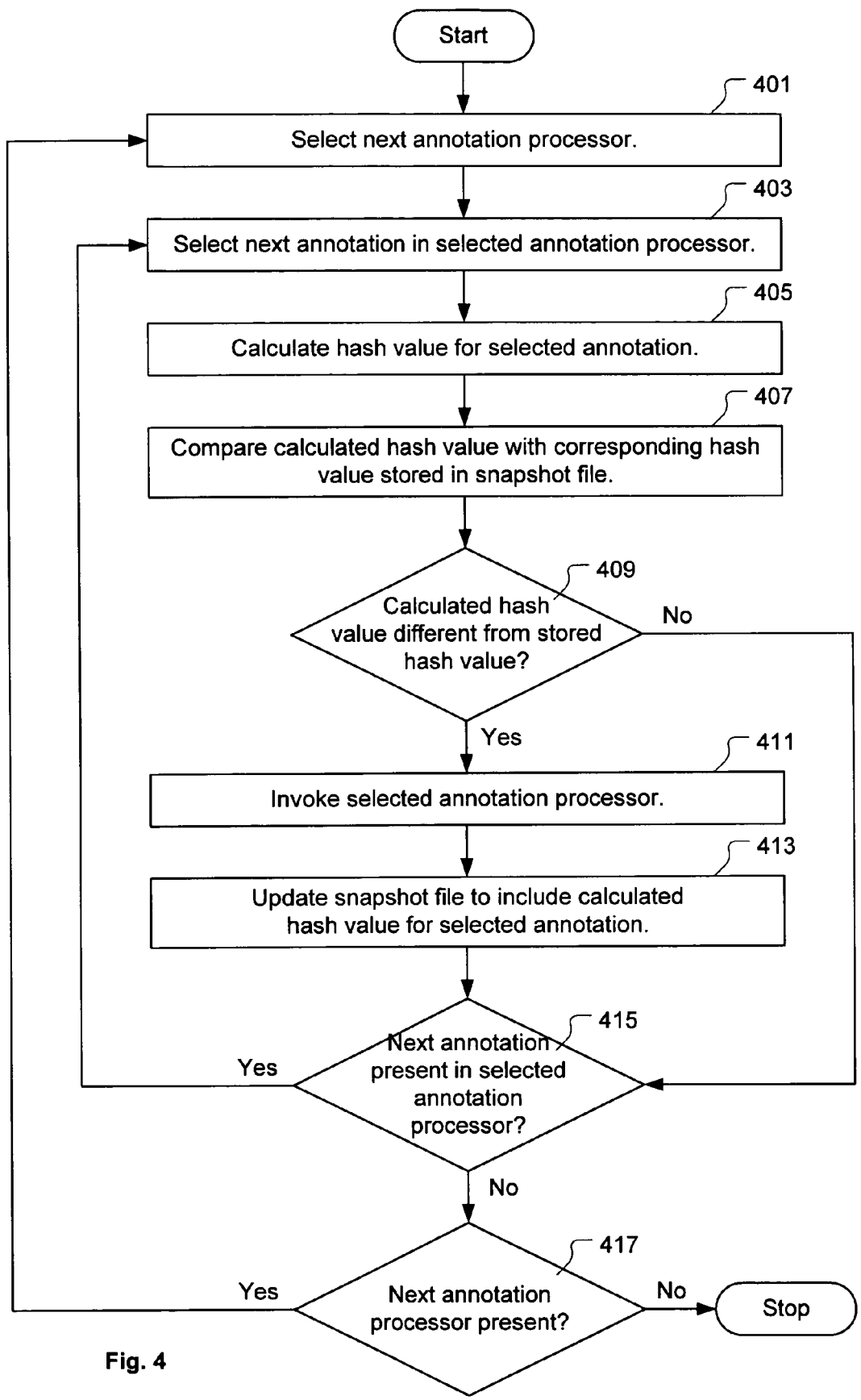
FIG. 4 depicts a flowchart diagram illustrating the method operations performed in an exemplary incremental processing system implementing an incremental modification detector, in accordance with another embodiment of the present invention.

FIG. 4 is an illustration showing a flowchart of a method for implementing an incremental modification detecting tool (IMDT), in accordance with one embodiment of the present invention. The method includes an operation 401 for selecting an annotation processor. An operation 403 is then performed to select a next annotation associated with the annotation processor selected in operation 401. In operation 405, a hash value is calculated for the annotation selected in operation 403. An operation 407 is then performed to compare the hash value calculated in operation 405 with a corresponding hash value stored in a snapshot file.

From the operation 407, the method proceeds with a decision operation 409 for determining whether the calculated hash value from operation 405 is different from the stored hash value, based on the comparison performed in operation 407. If the calculated hash value is different from the stored hash value, the method proceeds with an operation 411 for invoking the annotation processor previously selected in operation 401. An operation 413 is also performed to update the snapshot file to include the hash value calculated in operation 405 as the hash value for the annotation selected in operation 403. From operation 413, the method proceeds to a decision operation 415. Also, if the calculated hash value is determined to be the same as the stored hash value in the decision operation 409, the method proceeds to the decision operation 415.

In the decision operation 415, a determination is made as to whether a next annotation is present in the annotation processor previously selected in operation 401. If a next annotation is present, the method reverts back to operation 403. Otherwise, the method proceeds to a decision operation 417 in which a determination is made as to whether a next annotation processor is present. If a next annotation processor is present, the method reverts back to operation 401. Otherwise, the method concludes.

It should be appreciated that the IMDT of the present invention can provide different incremental code generation levels. That is, if desired, the IMDT of the present invention can provide incremental code generation on an individual annotation processor so as to provide partial regeneration of code for an individual annotation. It should be further appreciated that although the illustrated embodiment uses hash values to detect modifications to the annotations or the source code, other embodiments may use other mechanisms to detect modifications to the annotations or the source code (e.g., use of individual time stamps associated with each annotation set and/or individual annotation).

Embodiments of the present invention may be implemented in various computer system configurations including hand-held devices, microprocessor systems, microprocessor-based or programmable consumer electronics, minicomputers, mainframe computers and the like. The invention can also be used in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for selecting an annotation processor associated with an annotation for reprocessing, the annotation being included in a computer software source code, the method comprising:
    capturing an annotation snapshot of an annotation within an object-oriented program, wherein the annotation is defined to associate an attribute with a declaration within the object-oriented program, and wherein the annotation snapshot represents a current state of only structural information of the annotation;
    calculating a hash value for the captured annotation snapshot such that the hash value is based on only structural information of the annotation, such that a change in non-structural information of the annotation does not cause a change in the hash value calculated for the captured annotation snapshot, wherein the hash value for the captured annotation snapshot is a sum of hash values of structural source members within the captured annotation snapshot, and wherein the hash value of a given structural source member is calculated as an exclusive-or of a first hash value of a name of the given structural source member with a second hash value of a value of the given structural source member;
    comparing the calculated hash value for the captured annotation snapshot with a hash value of a previous captured instance of the annotation snapshot; and
    marking the annotation processor associated with the annotation for reprocessing if the hash value for the captured annotation snapshot is different from the hash value of the previous captured instance of the annotation snapshot.

2. The method as recited in claim 1, wherein when the hash value of the previous annotation snapshot is different from the annotation snapshot hash value, a previous structural information of the annotation is different from the current structural information of the annotation.

3. The method as recited in claim 1, the method further comprising:
    capturing a source code snapshot;
    calculating a hash value for the source code snapshot;
    comparing a source code snapshot hash value with a hash value of a previous source code snapshot; and
    marking the annotation for reprocessing if the source code snapshot hash value is different from the hash value of the previous source code snapshot.

4. The method as recited in claim 3, wherein capturing the snapshot of the source code includes capturing a state of a current structural information of the source code.

5. The method as recited in claim 4, wherein generating the source code snapshot hash value includes generating the hash value for the current structural information of the source code.

6. The method as recited in claim 1, wherein when the hash value of the previous source code snapshot is different from the source code snapshot hash value, a previous structural information of the source code is different from the current structural information of the source code.

7. The method as recited in claim 1, wherein spaces, brackets, and ordering of modifiers are ignored when calculating the hash value of the given structural source member.

8. A method for limiting regeneration of a computer software source code, the method comprising:
    capturing a source code snapshot representing a current state of only structural information of a source code;
    capturing an annotation snapshot representing a current state of only structural information of an annotation within the source code;
    repeating the capturing of the annotation snapshot for each annotation within the source code;
    calculating a source code hash value for the captured source code snapshot such that the source code hash value is based on only structural information of the source code, such that a change in non-structural information of the source code does not cause a change in the source code hash value;
    for each captured annotation snapshot, calculating a respective annotation hash value for the captured annotation snapshot such that the annotation hash value is based on only structural information of the annotation, such that a change in non-structural information of the annotation does not cause a change in the respective annotation hash value, wherein the respective annotation hash value is a sum of hash values of structural source members within the corresponding captured annotation snapshot, and wherein the hash value of a given structural source member is calculated as an exclusive-or of a first hash value of a name of the given structural source member with a second hash value of a value of the given structural source member;
    comparing the calculated source code hash value with a previously calculated source code hash value;
    marking the source code for regeneration when the calculated source code hash value is different from the previously calculated source code hash value;
    comparing the calculated annotation hash values with corresponding previously calculated annotation hash values; and
    marking a given annotation for regeneration when the calculated annotation hash value of the given annotation is different from the previously calculated annotation hash value of the given annotation.

9. The method as recited in claim 8, the method further comprising:
    marking all annotations within the source code for regeneration when the calculated source code hash value is different from the previously calculated source code hash value.

10. The method as recited in claim 8, further comprising:
    storing the source code snapshot and the snapshot of each annotation within the source code to a new snapshot file.

11. The method as recited in claim 10, the method further comprising:
    replacing an existing snapshot file of the source code with the new snapshot file of the source code if either the calculated source code hash value or any calculated annotation hash value is different from its corresponding previously calculated hash value.

12. The method as recited in claim 8, wherein spaces, brackets, and ordering of modifiers are ignored when calculating the hash value of the given structural source member.

13. A computer readable storage device including program instructions for an incremental source code processing system, comprising:

an incremental modification detecting tool (IMDT) including:

a snapshot generator defined to capture respective annotation snapshots for each of a number of annotations present within a source code, wherein each of the annotation snapshots represent a current state of only structural information within its respective annotation, a hash generator defined to calculate a respective annotation hash value for each annotation snapshot, whereby each annotation hash value is based on only structural information within its respective annotation, such that changes in non-structural information of a given annotation do not cause a change in the annotation hash value of the given annotation, wherein the respective annotation hash value is a sum of hash values of structural source members within the corresponding annotation snapshot, and wherein the hash value of a given structural source member is calculated as an exclusive-or of a first hash value of a name of the given structural source member with a second hash value of a value of the given structural source member, an evaluator defined to identify a change between any annotation hash value and its respective previously calculated annotation hash value, an annotation marker defined to mark an annotation processor of a given annotation within the source code for execution when the evaluator identifies a change between the calculated annotation hash value of the given annotation and its previously calculated annotation hash value; and an annotation processing tool (APT) defined to execute each marked annotation processor.

14. The computer readable storage device including program instructions for an incremental source code processing system as recited in claim 13, wherein spaces, brackets, and ordering of modifiers are ignored when calculating the hash value of the given structural source member.

\* \* \* \* \*